United States Patent [19]

Umezawa

[11] Patent Number: 4,654,709
[45] Date of Patent: Mar. 31, 1987

[54] VERTICAL CONTOUR CORRECTION DEVICE

[75] Inventor: Toshimitsu Umezawa, Kazo, Japan

[73] Assignee: Kabushiki Kaisha Toshiba, Kawasaki, Japan

[21] Appl. No.: 674,651

[22] Filed: Nov. 26, 1984

[30] Foreign Application Priority Data

Nov. 26, 1983 [JP] Japan ................................. 58-221395
Mar. 30, 1984 [JP] Japan ................................. 59-060819

[51] Int. Cl.⁴ ............................................. H04N 5/14
[52] U.S. Cl. ..................................... 358/166; 358/162
[58] Field of Search .................... 358/166, 162, 37, 38

[56] References Cited

U.S. PATENT DOCUMENTS

| | | | | |
|---|---|---|---|---|
| 4,047,224 | 9/1977 | Yamagati | ............................ | 358/166 |
| 4,481,537 | 11/1984 | Tanaka | ............................ | 358/162 |
| 4,558,354 | 12/1985 | Tanaka | ............................ | 358/116 X |
| 4,588,347 | 12/1985 | Pritchard | ........................ | 358/166 X |

FOREIGN PATENT DOCUMENTS 55-19551 5/1980 Japan .
2105140 3/1983 United Kingdom .

Primary Examiner—Howard W. Britton
Assistant Examiner—Victor R. Kostak
Attorney, Agent, or Firm—Schwartz, Jeffery, Schwaab, Mack, Blumenthal & Evans

[57] ABSTRACT

The vertical contour correction device in accordance with the present invention comprises a first addition circuit for receiving a video signal from the video signal source as a first signal, for the purpose of combining a first signal and a second signal, a delay line connected with its input terminal to the output terminal of the first addition circuit, for taking out, at its output terminal, a signal supplied to its input terminal by delaying it by the duration of one horizontal scan, a subtraction circuit for mixing subtractively the signal obtained at the output terminal of the delay line and the first signal, a feedback network for supplying to the first addition circuit with the output signal of the subtraction circuit, as a second signal, by processing it to have a lower level and opposite polarity relative to the first signal, and a second addition circuit for taking out a video signal with pre-shoot and overshoot by mixing additively and at a prescribed ratio the signal obtained at the output terminal of the delaying means and the output signal of the subtraction circuit.

16 Claims, 64 Drawing Figures

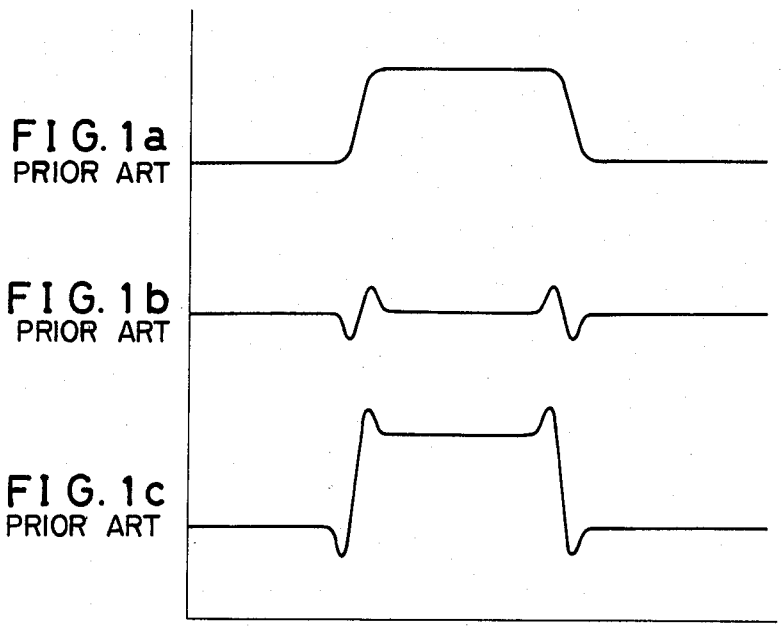
FIG. 1a PRIOR ART
FIG. 1b PRIOR ART
FIG. 1c PRIOR ART
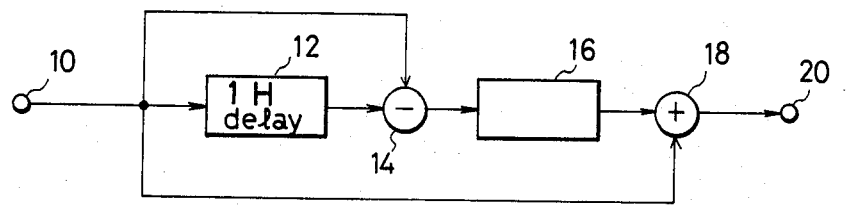
FIG. 2 PRIOR ART FIG. 3
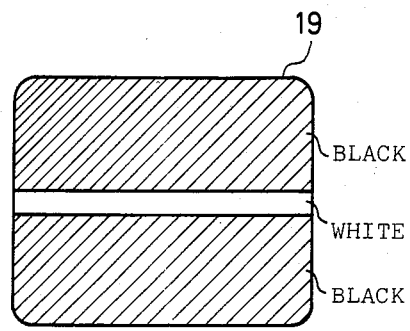
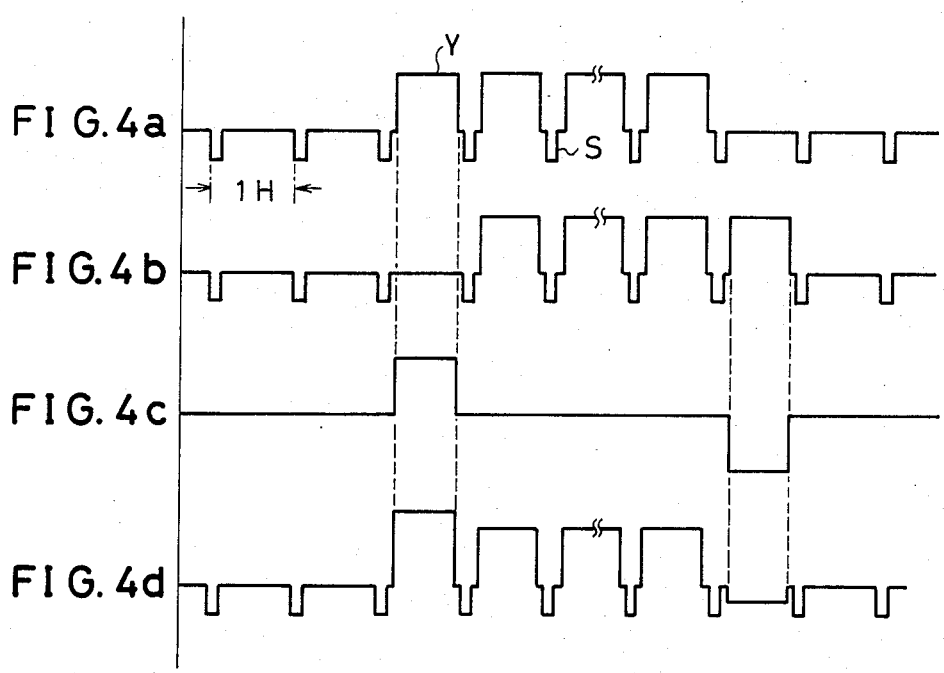

FIG. 5
PRIOR ART
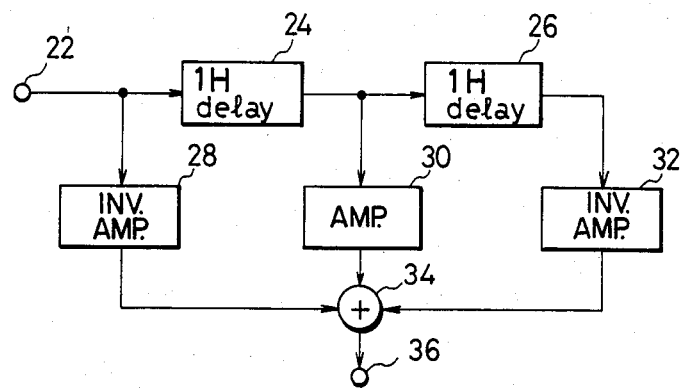
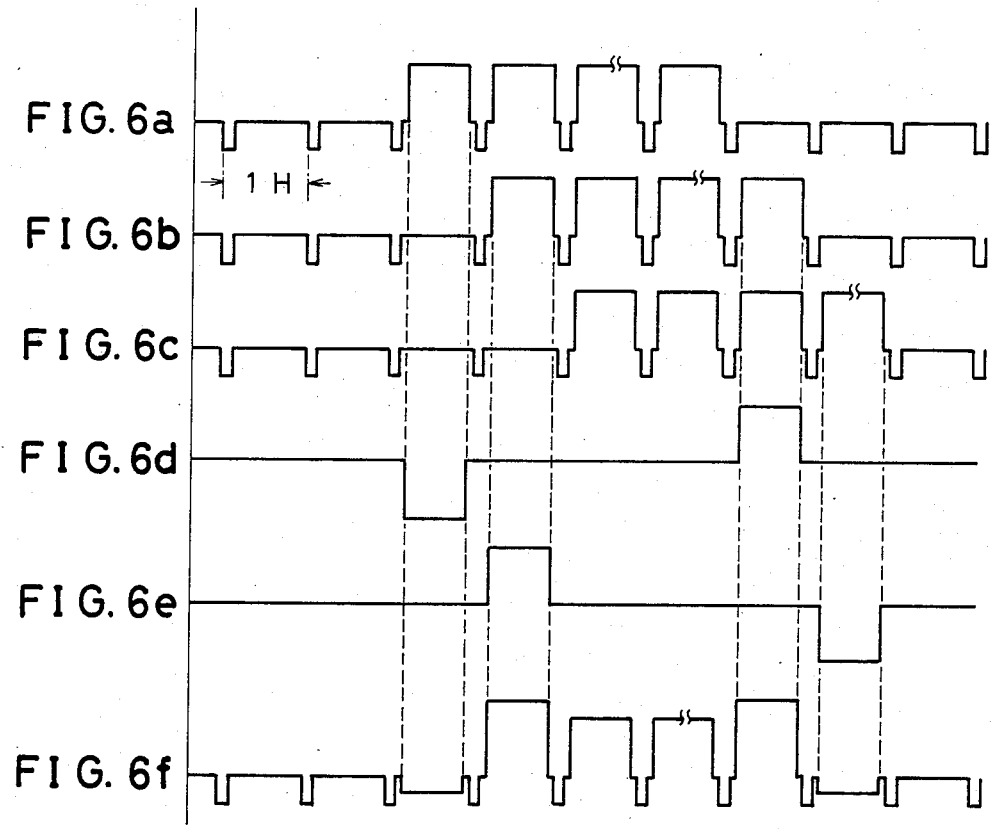
FIG. 6a
FIG. 6b
FIG. 6c
FIG. 6d
FIG. 6e
FIG. 6f

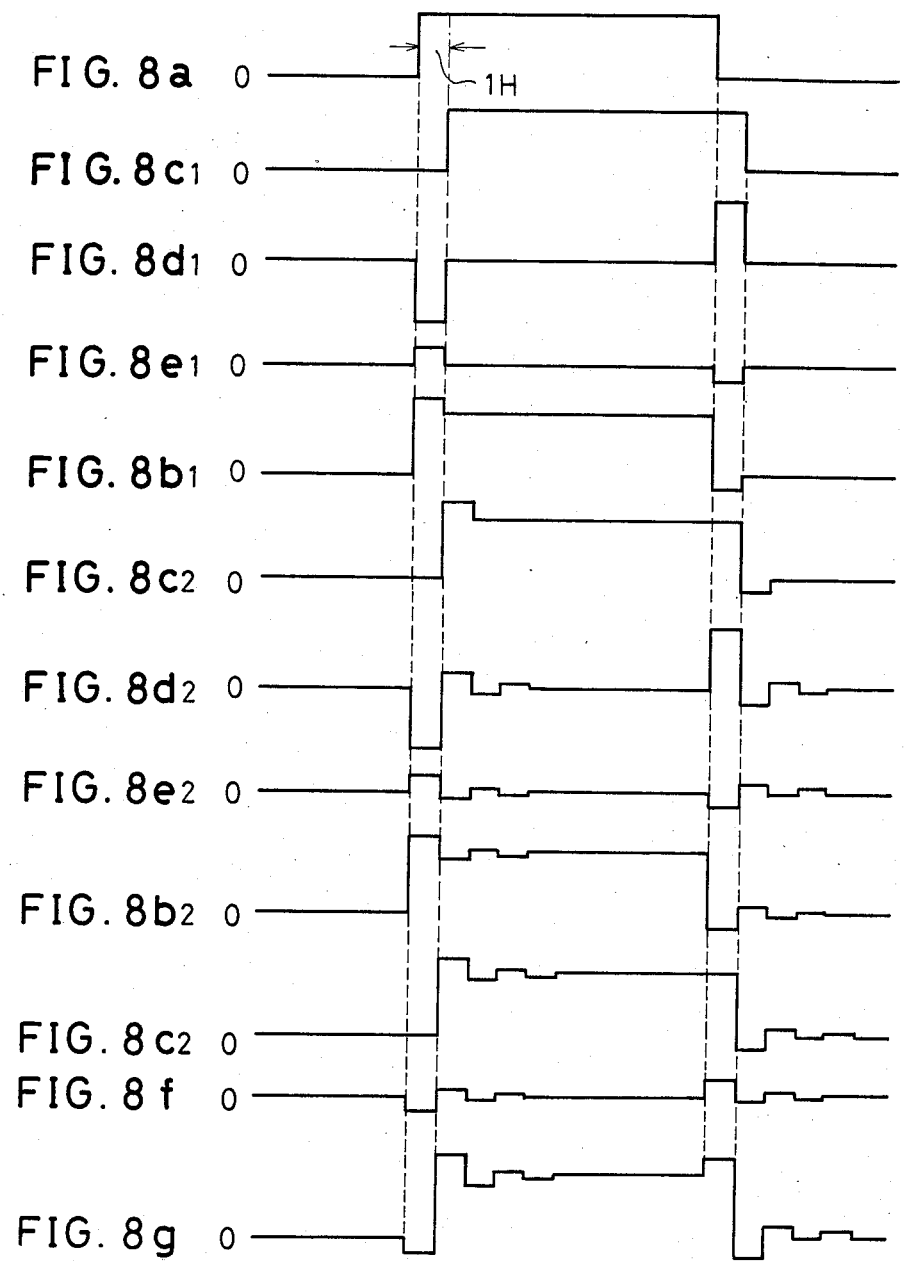

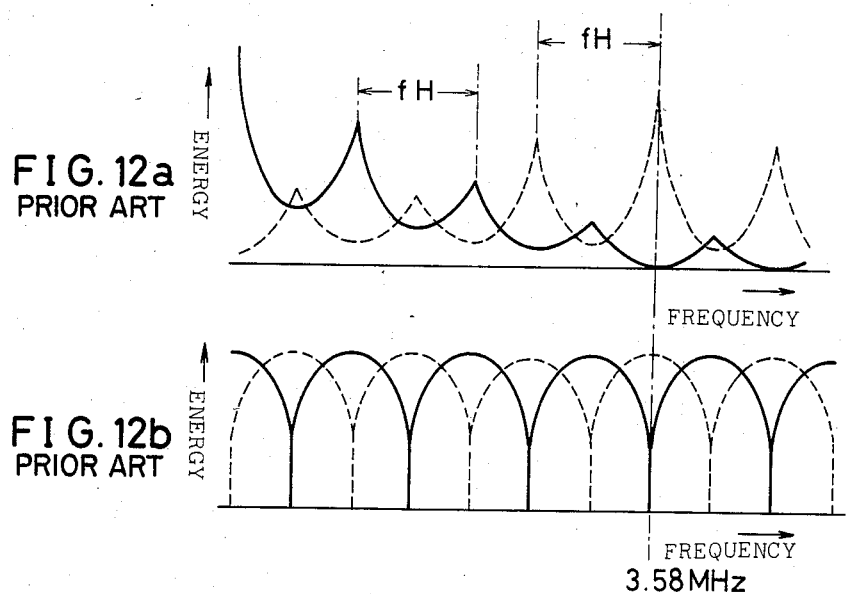
FIG. 12a PRIOR ART
FIG. 12b PRIOR ART
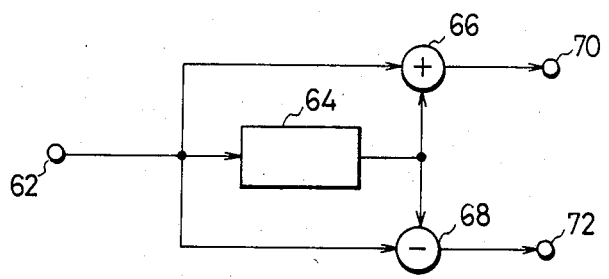
FIG. 13 PRIOR ART

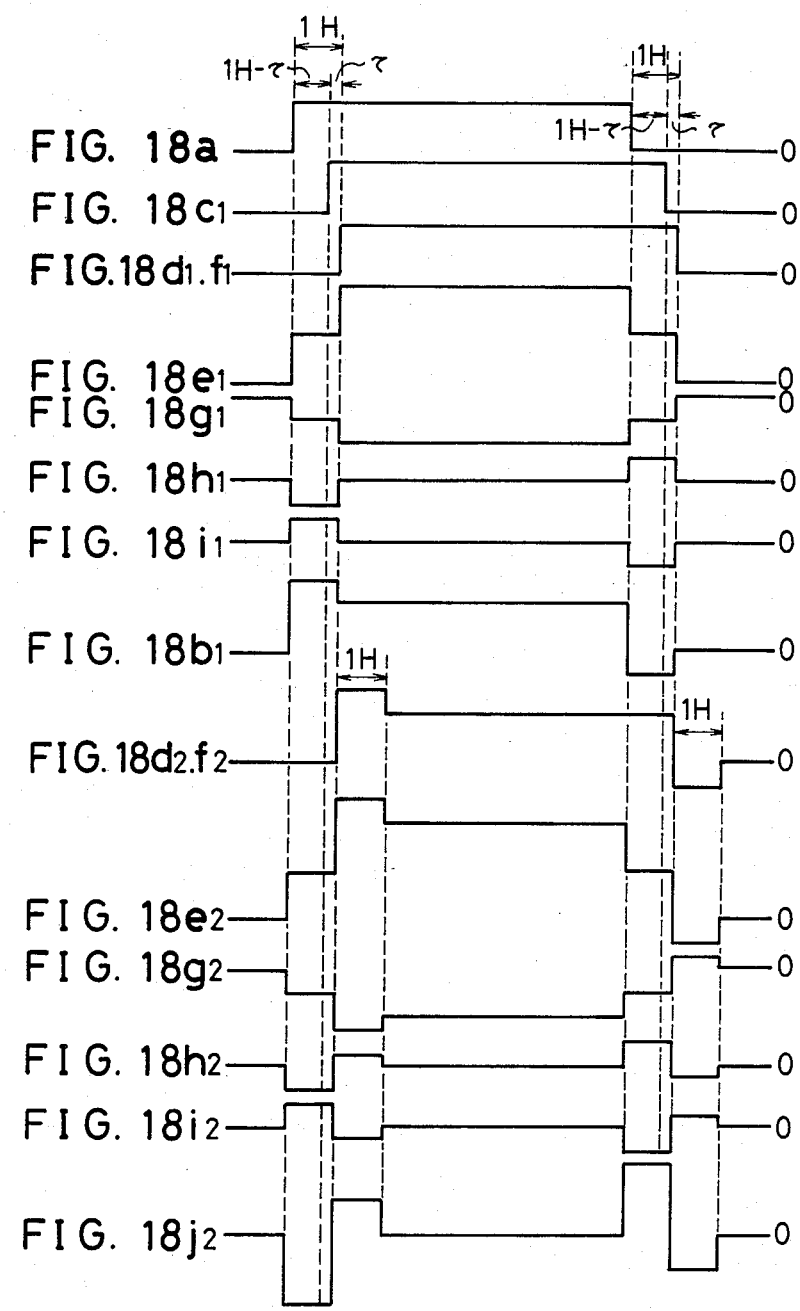

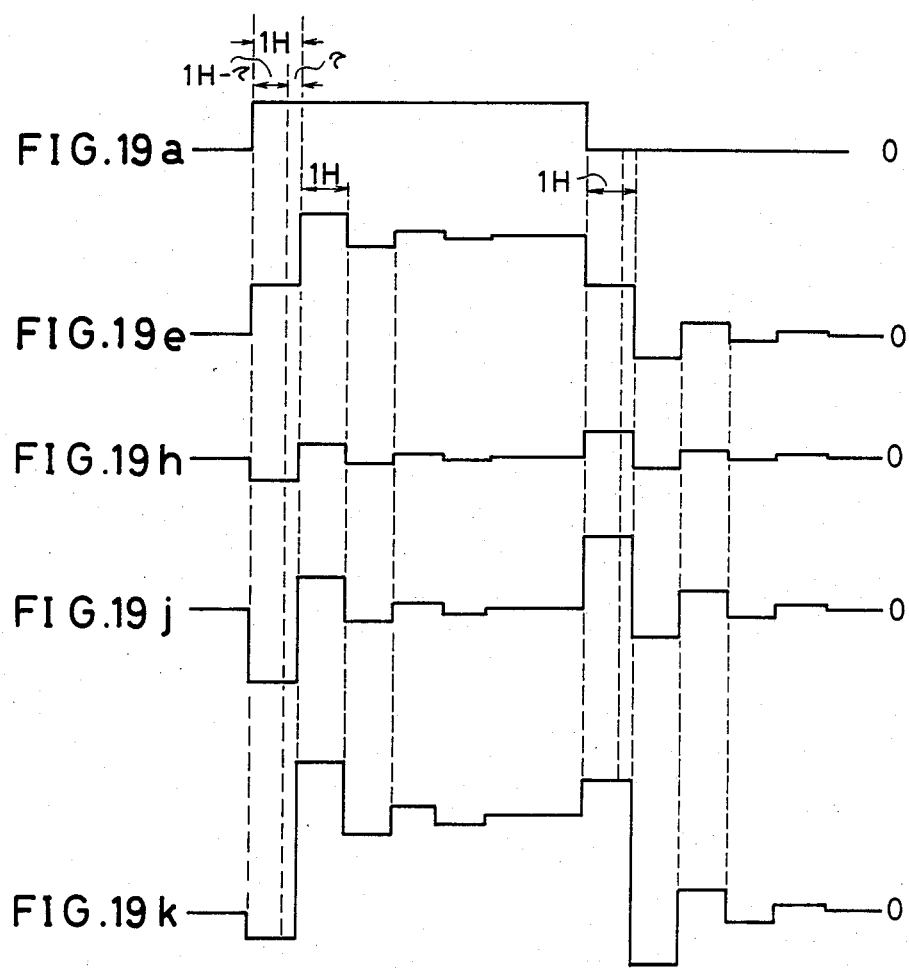

VERTICAL CONTOUR CORRECTION DEVICE

BACKGROUND OF THE INVENTION

1. Field of the Invention

The present invention relates to a vertical contour correction device in a picture imaging apparatus for color television receivers and the like, and in particular to a vertical contour correction device adapted to give simultaneously preshoots and overhoots to the contour portion in the vertical direction.

2. Description of the Prior Art

The bandwidth of the video signals of the transmitting and receiving system for television is generally limited 4.2 MHz. Signal components in the higher frequency band than this are not transmitted so that there exist in principle such phenomenon as rounding in fine portions or edge portions of the original pattern, constituting the main factor for the degradation of the sharpness of the television pictures produced.

To improve the sharpness, there has been known a technique of adding preshoots and overshoots in the front and rear of the edge portion of the video signal. This will be described by referring to FIGS. 1a to 1c.

When an image signal which varies in step fashion as shown in FIG. 1a is inputted, a contour correction signal can be obtained by taking the first and second derivatives of the signal. FIG. 2b shows an example of the twice differentiated waveform. Contour correction is accomplished by obtaining a signal with a preshoot and an overshoot, as shown in FIG. 1c, through superposition of the wave-form signal of FIG. 1(b) to the input signal of FIG. 1(a).

However, the contour correction like in the above has the following problem. Namely, to obtain the twice-differentiated waveform a circuit which includes an inductor, a capacitor, and a resistor is usually used. This means basically that contour correction can be achieved for the horizontal direction alone of the reproduced picture.

In a transmitting and receiving system for television, the grayishness of the picture element is converted to an electrical signal continuous in time by scanning the picture on the transmitting side of the picture. The signal is reproduced on the receiving side of the picture as a two-dimensional picture by carrying out assembly scanning synchronous with the decomposition scanning of the picture on the transmitting side. Because of this, the signal at the time earlier by one horizontal scanning period (1H) is needed in order to give a contour correction for the vertical direction of the picture.

Signals at a time earlier by 1H may be obtained by the use of a delay circuit like a charge coupled device (CCD), and as a prior art device for accomplishing vertical contour correction by means of such a delay circuit there has been known one like the following.

Namely, the prior art vertical contour correction device comprises a 1H delay circuit (referred to as 1H delay line hereafter) of a CCD or the like connected to the input terminal of the video signal, a subtraction circuit for subtracting the output signal of the 1H delay line from the video signal, an amplifier for adjusting the amplitude of the output signal of the subtraction signal with a prescribed amplification factor, and an addition circuit for outputting the result of adding the signal from the amplifier to the input video signal.

With a correction circuit of the above construction, it is possible to obtain an output signal waveform with overshoot added on at the leading edge and the trailing edge in the vertical direction.

It is noted that, although a correction circuit which adds overshoots is described in the foregoing, a circuit which is to add preshoots could also be readily inferred.

However, such a correction where only one of overshoot or preshoot is added is not quite satisfactory because of the unnatural result of the reproduced picture, though admittedly it improves the sharpness to some degree. For this reason, it has been desired to add the overshoot and the preshoot at the same time.

To resolve this problem, there has been provided a vertical contour correction device which is adapted to give the preshoot and the overshoot at the same time. This prior art vertical contour correction device comprises a first 1H delay line connected to a input terminal of the video signal, a second 1H delay line connected to the output terminal of the first 1H delay line, a first inverting amplifier for inverting and amplifying the input video signal, an amplifier for amplifying the output signal of the first 1H delay line, a second inverting amplifier for inverting and amplifying the output signal of the second 1H delay line, and an adder for outputting the sum of the output signals of the first and second inverting amplifiers and the amplifier.

By the use of vertical contour correction device like the above, it is possible to obtain an output signal waveform which has preshoots and overshoots at the vertical leading edge and the vertical trailing edge.

However, a vertical contour correction device like the above creates a new disadvantage in that it requires two 1H delay lines so that the circuit involved becomes large when constructed with a delay circuit like a CCD.

SUMMARY OF THE INVENTION

An object of the present invention is to provide a vertical contour correction device which is adapted to furnish preshoots and overshoots in an well balanced manner as well as to reduce the circuit scale to a large extent.

Another object of the present invention is to provide a vertical contour correction device which is capable of functioning as a comb line filter as well as reliably correcting the vertical contour portion of the picture.

Another object of the present invention is to provide a vertical contour correction device which is adapted to furnish preshoots and overshoots in a well balanced manner to the vertical contour with the use of a single 1H delay line.

Briefly described, these and other objects of the present invention are accomplished by the provision of an improved vertical contour correction device which includes a video signal source, a first combining device for combining a first signal and a second singal in which a video signal from the video signal source is supplied as the first signal, a delaying device whose input terminal is connected to the output terminal of the first combining device, and delays the signal that is supplied at its input terminal for a period of one horizontal scanning, a subtractive mixing device for mixing subtractively the signal obtained at the output terminal of the delay device and the first signal, a feedback network for supplying a signal, which is obtained by processing the output signal of the subtractive mixing device to have a lower level and opposite polarity compared with the first signal, to the first combining device, as the second signal, and an additive mixing device for taking out a video signal with preshoots and overshoots by mixing additively, at a prescribed ratio, the signal obtained at the output terminal of the delaying device and the output signal of the subtractive mixing device.

A vertical contour correction device of another form in accordance with the present invention is equipped at least with a color television signal source, a first combining device for combining a first signal and a second signal in which the signal from the color television signal source is supplied as the first signal, a delaying device whose input terminal is connected to the output terminal of the first combining device, for outputting the signal, delayed by a period of one horizontal scanning relative to the first signal, a subtractive mixing device for mixing subtractively the signal delayed by the delaying means and the first signal, a low-pass filter for taking out a low frequency signal by separating it out from the subtractively mixed signal by means of the subtractive mixing device, a feedback circuit for supplying to the first combining device, as the second signal, a signal with a lower level and opposite polarity relative to the first signal, obtained by processing the signal separated by the low-pass filter, and an additive mixing device for taking out a luminance signal with preshoot and overshoot as an additively mixed output, with a prescribed ratio, of the first signal, the signal delayed by the delaying means, and the signal separated by the low-pass filter.

BRIEF DESCRIPTION OF THE DRAWING

These and other objects, features, and advantages of the present invention will be more apparent from the following description of a preferred embodiment taken in conjunction with the accompanying drawings in which:

FIGS. 1a to 1c are diagrams of signal waveform to illustrate the operation of a prior art vertical contour correction device utilizing a second derivative circuit;

FIG. 2 is a circuit diagram showing an example of prior art vertical contour correction device;

FIG. 3 is an illustrative diagram of the television picture for explaining the operation of the circuit shown in FIG. 2;

FIGS. 4a through 4d are diagrams of signal waveforms for various parts to be used for explaining the operation of the circuit shown in FIG. 2;

FIG. 5 is a circuit diagram showing another example of a prior art vertical contour correction device;

FIGS. 6a through 6f are diagrams of signal waveforms for various parts to be used for explaining the operation of the circuit shown in FIG. 5;

FIGS. 8a through 8g and FIGS. 9a through 9d are diagrams of signal waveforms for explaining the operation of the circuit shown in FIG. 7;

FIGS. 12a and 12b are diagrams illustrating the frequency spectrum and the comb line filter characteristics of the color television signals according to the NTSC system;

FIG. 13 is a block diagram for the comb line filter;

FIGS. 18a through 18j$_2$ and FIGS. 19a through 19k are signal waveform diagrams for various parts to be used for explaining the operation of the circuit shown in FIG. 16.

DESCRIPTION OF THE PREFERRED EMBODIMENTS

Figure 7:
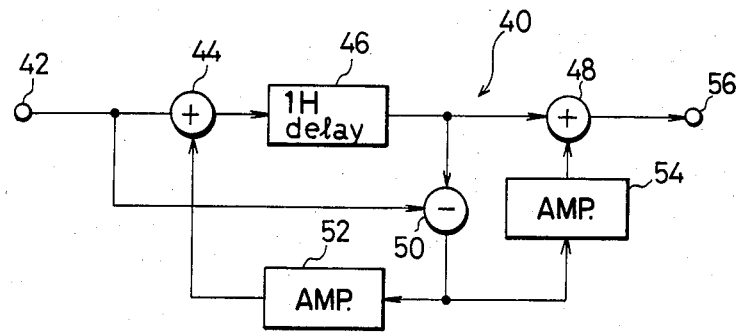
FIG. 7 is a circuit diagram illustrating an embodiment of the vertical contour correction device in accordance with the present invention.

To facilitate the understanding of the present invention, a brief reference will be made to prior art vertical contour correction device illustrated in FIGS. 2 to 6.

Referring to FIG. 2, the prior art vertical contour correction device includes a video signal input terminal 10 to which is connected a 1H delay line 12 such as CCD or the like, a subtraction circuit 14 for subtracting the output signal of the 1H delay line from the video signal, an amplifier 16 for amplifying the output signal of the subtraction circuit 14 with a prescribed amplification factor, and an addition circuit 18 for outputting the sum of the signal from the amplifier 16 and the input video signal.

The operation of the prior art circuit shown in FIG. 2 will now be illustrated by referring to FIGS. 3 and 4. In FIG. 3 there is shown a picture 19 on a display such as a cathode ray tube. Consider the case in which a pattern signal is received to form a picture consisting of "black", "white", and "black" along the vertical direction as shown in FIG. 3. Then, on the input terminal 10 in FIG. 2 there is applied a video signal a as shown by FIG. 4a. In FIG. 4a, S indicates a horizontal synchronizing signal and Y indicates a pattern signal component, while one horizontal scanning period is represented by 1H.

The signal a is delayed by a time 1H by the 1H delay line 12 to produce a signal waveform as shown in FIG. 4b. Then, the signal b is subtracted from signal a by the subtraction circuit 14 to produce a subtracted output c as shown in FIG. 4c. The signal c is adjusted with a prescribed amplification by the amplifier 16, and is superposed onto the input signal a by the addition circuit 18. As a result, at the output terminal 20 there is obtained a signal waveform d with an overshoot added at the leading edge and the trailing edge in the vertical direction, as shown in FIG. 4d. It is to be noted that, although the circuit shown in FIG. 2 is a kind to furnish overshoots, it is possible to readily infer a circuit which furnishes preshoots.

However, a correction which performs either one of overshoots or preshoots alone is not fully satisfactory because of an unnatural rendering of the reproduced picture, even though it improves the sharpness to some extent. For this reason, it is desirable to have a correction device which furnishes overshoots and preshoots at the same time.

In FIG. 5 is shown an example of vertical contour correction device which is capable of furnishing both of the overshoots and the preshoots at the same time.

This prior art vertical contour correction device comprises an input terminal 22 for the video signal, a first 1H delay line 24 connected to the input terminal 22, a second 1H delay line 26 connected to the output terminal of the first 1H delay line 24, a first inverting amplifier 28 which inverts and amplifies the input video signal, an amplifier 30 which amplifies the output signal of the first 1H delay line 24, a second inverting amplifier 32 which inverts and amplifies the output signal of the second 1H delay line 26, and an adder 34 which outputs the result of summation of the output signals from the first and second inverting amplifiers 28 and 32 and an amplifier 30.

The operation of the circuit shown in FIG. 5 will now be illustrated by referring to FIGS. 6a through 6f. FIG. 6a shows the signal waveform at the input terminal 22 corresponding to a picture as shown in FIG. 3, which is the same as in FIG. 4 shown earlier. This signal waveform a is delayed by 1H by the first 1H delay line 24, and becomes as shown in FIG. 6b. It is further delayed by 1H by the second 1H delay line to give a result as shown in FIG. 6c. FIG. 6d shows the signal waveform d obtained by summing the output of the amplifier 30 and the output of the first iverting amplifier 28, and FIG. 6e shows the signal waveform e for the sum of the output of the amplifier 30 and the output of the second inverting amplifier 32. As a result, the output of the addition circuit 34, that is, the signal waveform of the output terminal 36, which is the sum of the waveforms b, d and e is carried the preshoots and the overshoots as shown in FIG. 6f.

Here, the analytical expressions for the signal at various points in FIG. 5 will be explained. The input signal to the input terminal 22 of FIG. 5 is represented by V(t), the output signals of the first and second delay lines by $V_A$, and $V_B$, respectively, the output signals of the amplifiers 28, 30, and 32 by $V_C$, $V_D$, and $V_E$, respectively, and the output signal of the output terminal 36 by $V_F$. Then we have $$V_A = V(t-H) \quad (1)$$

$$V_B = V(t-2H) \quad (2)$$

(Here, H represents the duration of one horizontal scan.) If the amplifications of the amplifiers 28, 30, and 32 are called $-g_1$, $g_2$, and $-g_3$, respectively, we have $$V_C = -g_1 \cdot V(t) \quad (3)$$

$$V_D = g_2 \cdot V_A = g_2 \cdot V(t-H) \quad (4)$$

$$V_E = -g_3 \cdot V_B = -g_3 \cdot V(t-2H) \quad (5)$$

Therefore, the output signal $V_F$ is given by $$V_F = V_C + V_D + V_E \quad (6)$$
$$= -g \cdot V(t) + g_2 \cdot V(t-H) - g_3 \cdot V(t-2H)$$

If we choose $$g_1 = g_3 = g, \; g_2 = 1 + 2g$$

Eq. (6) becomes $$V_F = -g \cdot V(t) + (1+2g) \cdot V(t-H) - g \cdot V(t-2H) \quad (7)$$

which may further be represented as $$V_F = V(t-H) + g\{V(t-H) - V(t)\} + g\{V(t-H) - V(t-2H)\} \quad (8)$$

For an input as shown in FIG. 6a, V(t−H) and V(t−2H) are represented by FIGS. 6b and 6c, and the output $V_F$ respresented as the sum of the various terms on the right-hand side of Eq. (8) becomes as shown in FIG. 6f. In this way, it becomes possible to attach preshoots and overshoots to the contour portion.

Furthermore, if the mapping function of the first and second 1H delay lines 24 and 26 are called D, and the signal on the input side and the signal on the output side of each 1H delay line are called Vin and Vout, respectively, then we have $$V_{out}(t) = D \cdot V_{in}(t) \quad (9)$$

Since $$V_{out}(t) = V_{in}(t-H) \quad (10)$$

Eq. (8) above may be represented by $$V_F = D \cdot V(t) + g\{(D \cdot V(t) - V(t)\} + g\{[D \cdot V(t)] - D[D \cdot V(t)]\} \quad (11)$$

in terms of the mapping function D.

However, a vertical contour correction device shown in FIG. 5 requires two 1H delay lines so that it leads to a disadvantage in that the circuit becomes large-scaled if it is to be constructed utilizing CCD or the like.

The present invention which is aimed to resolving such a problem as described in the above will be explained by referring to FIGS. 7 through 21.

Referring now to FIG. 7, there is shown a vertical contour correction device embodying the present invention with a reference numeral 40. The vertical contour correction device 40 has a signal input terminal 42 which is supplied a video signal, and the input terminal 42 is connected one of the input terminals of a signal combining circuit, for example, an addition circuit 44. The output terminal of the addition circuit 44 is connected to the input terminal of a 1H delay line 46. The output terminal of the 1H delay line 46 is connected to one of the input terminals of an additive mixing circuit, for example, another addition circuit 48, and is also connected to one of the input terminals of a subtractive mixing circuit, for example, a subtraction circuit 50. The other input terminal of the subtraction circuit 50 is connected to the signal input terminal 42, while its output terminal is conntected to the other input terminal of the addition circuit 44 via an amplifier 52 with a prescribed amplification (in this example, it is a negative amplification). Further, the output terminal of the subtraction circuit 50 is connected to the other input terminal of the addition circuit 48 via an amplifier 54 with a prescribed amplification (in this example, it is a positive amplification ). The output terminal of the addition circuit 48 is represented by the signal output terminal 56.

Next, the operation of the circuit in FIG. 7 will be explained by referring to FIGS. 8a through 8g. In FIG. 8a there is shown a video signal a supplied to the input terminal 42 where for convenience the same signal as given in FIG. 6a is used here again by dropping the synchronizing signal component, and the duration of one horizontal scan is represented by 1H. The signal (a) in FIG. 8a is supplied, via the addition circuit 44, to the 1H delay line 46 where it is delayed to give a delayed output ($c_1$) as shown in FIG. $8c_1$. The delayed output ($C_1$) is combined with the input signal (a) by the subtraction circuit 50 to have the signal ($c_1$) to be subtracted from the signal (a) to give an output as shown in FIG. 8d. The output ($d_1$) is diverted to the amplifier 52 (amplification of $-g$) where it is inverted to produce a signal, as shown in FIG. $8e_1$, at the output terminal of the amplifier. The signal ($e_1$) is applied as a feedback signal to the other input terminal of the addition circuit 44 whose output, shown in FIG. $8b_1$, represents the sum of the input signal (a) and the feedback signal ($e_1$). Further, the summed signal ($b_1$) is delayed by 1H by the 1H delay line 46 to produce a delayed output ($c_2$) as shown in FIG. $8c_2$, and the signal ($c_2$) undergoes again a subtraction operation with the input signal a by the action of the subtraction circuit 50. The subtracted output is inverted again by the amplifier 52, and is fed back again to the addition circuit 44 as a feedback signal. As a result of repetition of such an action, the outputs of the subtraction circuit 50, the amplifier 52, the addition circuit 44, the 1H delay line 46, and the amplifier 54 (assuming a amplification of g) are represented by the signal waveforms as shown by ($d_2$), ($e_2$), ($b_2$), ($c_2$), and (f), respectively, of FIG. 8. Then, the output ($c_2$) of the 1H delay line 46 and the output (f) of the amplifier 54 are summed by the adition circuit 48 to produce a vertically contour corrected signal (g) with both of preshoots and overshoots, as shown by FIG. 8g, at the output terminal 56.

In this manner, with a circuit in accordance with the present invention as shown in FIG. 7, it is possible to provide both of preshoots and overshoots by utilizing just one 1H delay line, as a result of arranging a feedback circuit which includes a subtraction circuit 50 and an amplifier 52 in between the output terminal of the 1H delay line 46 and the other input terminal of the addition circuit 44.

Next, there will be explained the analytical expressions for signals at various parts of the circuit shown in FIG. 7. First, let the signal level for various parts be designated as follows.

Va: Input signal applied to the signal input terminal 42,
Vb: Output signal of the addition circuit 44,
$Vc_2$: Output signal of the 1H delay line 46,
$Vd_2$: Output signal of the subtraction circuit 50,
$Ve_2$: Output signal of the amplifier 52,
Vf: Output signal of the amplifier 54, and
Vg: Output signal of the signal output terminal 56. Further, by representing the amplification degree of the amplifier 52 to $-g$, the amplification degree of the amplifier 54 to g, and the mapping function of the 1H delay line 46 to D, $$\left.\begin{array}{l} Vb_2 = Va + Ve_2, \\ Vc_2 = D \cdot Vb_2, \\ Vd_2 = Vc_2 - Va, \\ Ve_2 = -g \cdot Vd_2, \\ Vf = g \cdot Vd_2, \\ Vg = Vc2 + Vf. \end{array}\right\} \quad (12)$$

If Va=V(t) is set, $$\begin{aligned} Vb_2 &= V(t) + Ve_2 \\ &= V(t) - g \cdot Vd_2 \\ &= V(t) - g \cdot [VC_2 - V(t)] \\ &= (1 + g) \cdot V(t) - g \cdot VC_2 \end{aligned} \quad (13)$$

Further, $$VC_2 = D \cdot Vb_2 \quad (14)$$

$$Vd_2 = D \cdot Vb_2 - V(t) \quad (15)$$

$$Vf = g \cdot [D \cdot Vb_2 - V(t)] \quad (16)$$

so that by substituting Eqs. (14) and (16) into $Vg = Vc_2 + Vf$ mentioned earlier we obtain $$\begin{aligned} Vg &= VC_2 + Vf \\ &= D \cdot Vb_2 + g \cdot [D \cdot Vb_2 - V(t)] \\ &= -g \cdot V(t) + (1 + g) \cdot D \cdot Vb_2 \end{aligned} \quad (17)$$

Then, by substituting Eq. (13) into $Vb_2$ of Eq. (17) we have $$Vg = -g \cdot V(t) + (1+g) \cdot D[(1+g) \cdot V(t) - g\, VC_2] \quad (18)$$

which may further be rearranged to give $$Vg = -g \cdot V(t) + (1+g) \cdot D((1+g) \cdot V(t) - g \cdot D \\ ((1+g) \cdot V(t) - g \cdot D \cdot [\ldots] \ldots) \ldots) \quad (19)$$

The above can further be expressed as $$Vg = D \cdot V(t) + g \cdot \{[D \cdot V(t)] - V(t)\} + \quad (20) \\ g\{[D \cdot V(t) - D[D \cdot V(t)]\} + g^2[D \cdot V(t)] - g \cdot (2g + g^2) \cdot \\ D[D \cdot V(t)] + (1 + g) \cdot g^2 \cdot D[D[D(1 + g) \cdot V(t) - gD[\cdots]\}]\}\cdots$$

Figure 9A:
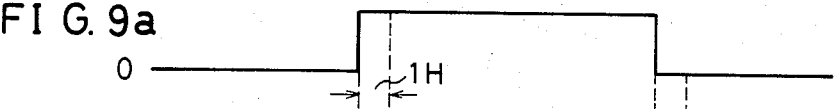
Figure 9B:
Figure 9C:
Figure 9D:

Now, by comparing Eq. (20) with Eq. (11) shown earlier, it will be observed that the sum of the first, seemed, and third terms on the right-hand side of Eq. (20) is equal to Eq. (11), and that the sum of the fourth, fifth terms represents the error to Eq. (11). Referring to FIG. 9, FIG. 9a represents the input signal, FIG. 9b shows the output signal corresponding to Eq. (11), that is, to the circuit which employs two 1H delay lines shown in FIG. 5, and FIG. 9d shows the output signal for the circuit in accordance with the present invention (FIG. 7). The errors between the signals in FIGS. 9b and 9d are shown in FIG. 9c.

The errors can be determined by the expressions represented by the fourth and succeeding temrs of Eq. (20), and may be made to remain very small by an appropriate choice of the amplification g. Thus, eventually, the output signal of the output terminal 56 can be approximated by the waveform as shown by FIG. 9b.

For example, it is adequate to choose a value of ¼ or something like that for the amplification g.

In this way it becomes possible to furnish preshoots and overshoots to the vertical contour of the output signal.

Figure 10:
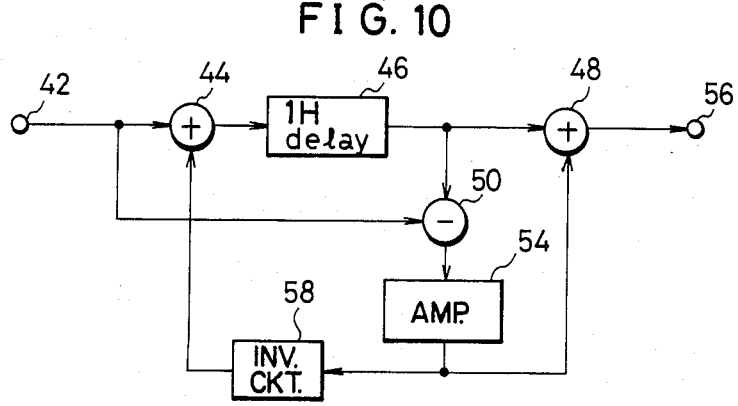
FIGS. 10 and 11 are circuit diagrams showing modifications to the circuit in FIG. 7.
Figure 11:
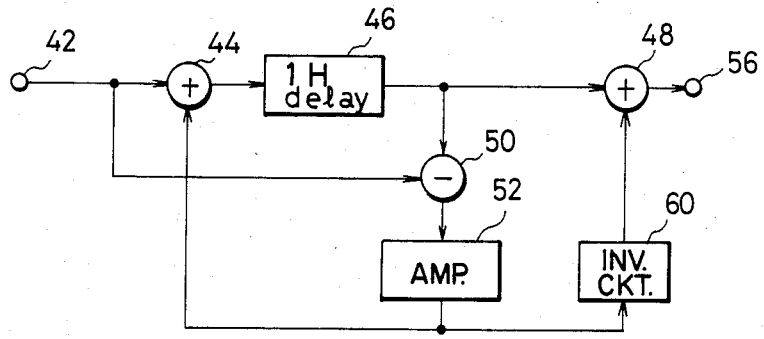

Next, modifications to the circuit shown in FIG. 7 will be illustrated by referring to FIGS. 10 and 11. Here, same symbols are assigned to the parts identical to those appearing in FIG. 7. First, in the modification shown in FIG. 10, an amplifier 54 (with amplification g) is connected to the output terminal of a subtraction circuit 50, and the output terminal of the amplifier 54 is connected to an addition circuit 48 as well as to another addition circuit 44 via an inventing circuit 58.

Further, in FIG. 11, an amplifier 52 (with amplification −g) is connected to the output terminal of a subtraction circuit 50, and the output terminal of the amplifier 52 is connected to an addition circuit 44 and to another addition circuit 48 via an inverting circuit 60.

That a similar action to the circuit of FIG. 7 can be accomplished by the circuits shown in FIGS. 10 and 11 will be understood easily.

Next, referring to FIGS. 12 through 21, description will be presented of another embodiment in accordance with the present invention which makes it possible to separate the luminance signal and the chrominance signal and to correct for the vertical contour, by combining the vertical contour corection device of the present invention and a comb line filter.

It is well known in NTSC system that, the color signal is transmitted as superposed by frequency interleaving the signal, as the carrier signal, to the high frequency component of the luminance signal. Namely, the solid line in FIG. 12a represents the frequency spectrum of the luminance signal with peaks at an interval of the horizontal frequency fH. In contrast to this, the chrominance signal (with its center frequency at 3.58 MHz) shown in the dotted line, is interleaved on the high frequency side of the luminance signal, with peaks of its frequency spectrum at the valleys of the frequency spectrum for the luminance signal.

Now, in reproducing color picture from the color television signals with such signal forms, it becomes necessary to take out the luminance signal and the chrominance signal separated from each other. A comb line filter circuit for taking them out separately is shown in FIG. 13. Namely, the comb line filter circuit shown in FIG. 13 comprises a signal input terminal 62 for supplying the color television signal, a delay line 64 for giving a delay of the periods of one horizontal scan, an addition circuit 66 and a subtraction circuit 68 for mixing additively and subtractively, respectively, the delayed output from the delay line 64 and the signal supplied to the input terminal 62, an output terminal 70 for the luminance signal, and an output terminal 72 for the chrominance signal.

FIG. 13 constitutes what is called the comb line filter which lets the more significant portions of the power spectra of the luminance and chrominance signals pass through selectively, and FIG. 12b shows the characteristics of the comb line filter. Since, however, FIGS. 12 and 13 are known generally, no further details will be given hereafter. It should be mentioned further that it is possible to carry out separation of the luminance signal and the correction to the vertical contour by combining the system shown in FIG. 13 and the vertical contour correction circuit shown earlier in FIG. 2. However, such a combination furnishes only one of the preshoots or overshoots alone, leading to an inconvenience of having unnaturally reproduced pictures as mentioned earlier. Of course, it is also possible to furnish both of the preshoots and overshoots by the use of two of the 1H delay lines, but it leads to an economic disadvantage because of the large scale of the circuit required.

The correction device in accordance with the present invention is for resolving these problems mentioned in the foregoing.

Figure 14:
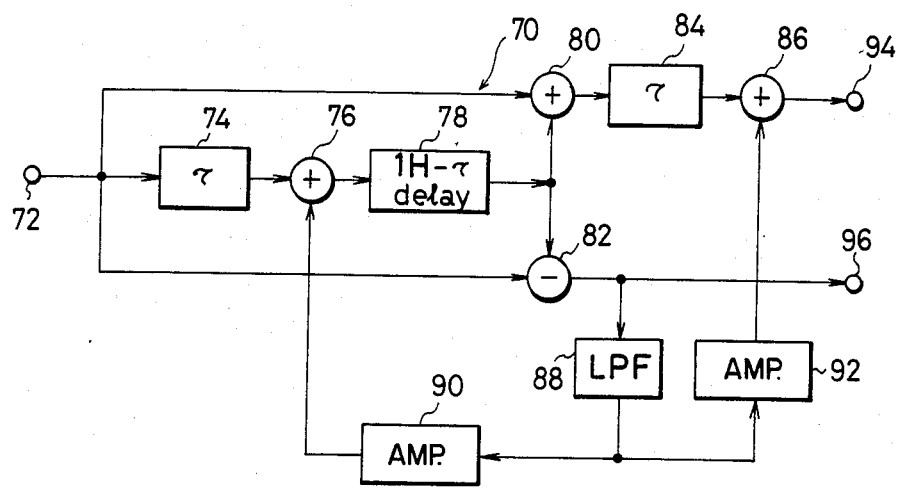
FIG. 14 is a circuit diagram illustrating another embodiment of the vertical contour correction device in accordance with the present invention.

Referring to FIG. 14, there is shown a vertical contour correction device with comb line filter function in accordance with the present invention, with the reference numeral 70.

The vertical contour correction device 70 has a signal input terminal 72 for supplying the color television signal, the input terminal 72 is connected to the input terminal of a delay element 74 with a delay time $\tau$, the output terminal of the delay element 74 is connected to one of the input terminals of an addition circuit 76, and the output terminal of the addition circuit 76 is connected to the input terminal of a delay line 78 with a delay time of $(1H-\tau)$. The output terminal of the delay line 78 is connected to one of the input terminals of an addition circuit 80 and one of the input terminals of a subtraction circuit 82, and the other input terminals of the addition circuit 80 and a subtraction circuit 82 are each connected to the signal input terminal 72. The output terminal of the addition circuit 80 is connected, via a delay element 84 with delay time $\tau$, to one of the input terminals of an addition circuit 86, while the output terminal of the subtraction circuit 82 is connected, via a low-pass filter 88, to the each input terminal of amplifiers 90 and 92. In the present example, the amplifier has a negative amplification of −g, while the amplifier 92 has a positive amplification of g. The output terminal of the amplifier 90 is connected to the other input terminal of the addition circuit 76, and the output terminal of the amplifier 92 is connected to the other input terminal of the addition circuit 80. The output terminal of the addition circuit 86 is connected to the output terminal 94 of the luminance signal, and the output terminal of the subtraction circuit 82 is connected to the output terminal 96 of the chrominance signal.

In FIG. 14, the delay time $\tau$ of the delay elements 74 and 84 is chosen to be approximately equal to the delay time of the signal created by the low-pass filter 88. That is, the delay time of the low-pass filter 88 is also $\tau$. In addition, the cut-off frequency of the low-pass filter is chosen at about 2 MHz.

Next, the operation of the circuit in FIG. 14 will be described. The color television signal is supplied to the signal input terminal 72, and this signal is delayed by $\tau$ by the delay element 74. It is then supplied to the delay line 78 via the addition circuit 76. Since the delay time of the delay line 78 is $(1H-\tau)$, the output of the delay line 78 is delayed precisely by 1H relative to the input signal to the input terminal 72. Accordingly, at the addition circuit 80 and the subtraction circuit 82, additive mixing and subtractive mixing take place between the signal applied to the input terminal 72 and the signals delayed by 1H. Therefore a luminance signal is produced at the output terminal of the addition circuit 80 and a chrominance signal at the output terminal of the subtraction circuit 82.

Furthermore, in the NTSC system, transmission of the chrominance components is carried out by modulating the chrominance subcarrier (3.58 MHz) by the chrominance components and by superposing them in the range between 2.1 MHz and 4.2 MHz within the video band of 4.2 MHz. That is to say, chrominance signal exists only within the range of 4.2 MHz above and 2.1 MHz below the center frequency of 3.58 MHz. On the other hand, when the signal exceeds 2 MHz, FIG. 14 becomes equivalent to FIG. 13 since the cut-off frequency of the low-pass filter 88 has been chose to be about 2 MHz. The low frequency component of the output of the subtraction circuit 82, namely, the output that appears at the output terminal 96 of the chrominance signal, is separated out by the low-pass filter 88, and is inverted with a prescribed amplification degree by the amplifier 90 to be supplied to the addition circuit 76. In other words, the feedback circuit consisting of the subtraction circuit 50 and the amplifier 52 in FIG. 7 is constructed in FIG. 14 by the subtraction circuit 86, the low-pass filter 88, and the amplifier 90. In addition, one of the input signals supplied to the addition circuit 76 is given a time delay of $\lambda$ by the delay element 74 and the other input signal (feedback signal) is given a time delay of $\tau$ by the low-pass filter 88, so that there is no temporal error between the two input signals to the addition circuit 76, giving rise to no adverse effect in the process of summing them.

Further, the output of the low-pass filter 88 is further amplified with a prescribed amplification degree by the amplifier 92 to be supplied to the addition circuit 86. The addition circuit 86 and the amplifier 92 correspond to the addition circuit 48 and the amplifier 54 in FIG. 7. At the output terminal of the addition circuit 86 there appears a luminance signal component with preshoots and overshootes, making it possible to achieve the correction to the vertical contour. It should be noted that the output of the addition circuit 80 is supplied to the addition circuit 86 as one of the input signal with a time delay of $\tau$. However, the other input signal is supplied with the same time delay given by the low-pass filter 88 so that there exists no temporal error between the two input signals, causing no adverse effect in the process of summing them.

In this way, the circuit shown in FIG. 14 possesses the characteristics of a comb line filter, and not only makes it possible to separate the luminance signal from the chrominance signal but also makes it possible to carry out a vertical contour correction furnished with preshoots and overshoots. Moreover, the circuit requires only one 1H delay line (though in FIG. 14 it is a delay line of (1H−$\tau$) so that the circuit scale can be made small. Furthermore, the delay elements 74 and 84 can be constructed with ordinary small delay element parts rather than a large scale circuit like CCD so that they place no special burden.

Figure 15:
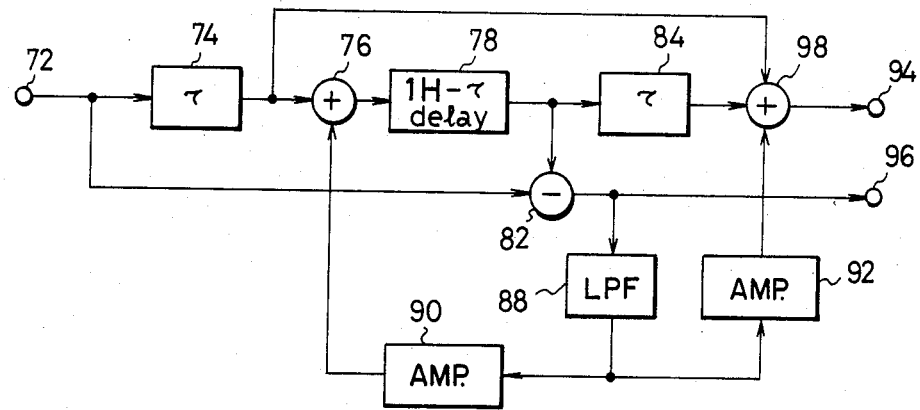
FIG. 15 is a circuit diagram showing a modification to the circuit given in FIG. 14.

In addition, FIG. 15 shows a modification to FIG. 14 in which the identical parts are designated by the identical symbols. In other words, in FIG. 15, the output of a (1H−$\tau$) delay line 78 is supplied to an addition circuit 98 via a delay element 84, and the output of an amplifier 92 and the output of a delay element 74 are supplied further to the addition circuit 98. The output terminal of the addition circuit 98 is connected to the output terminal 94 of the luminance signal. Therefore, the addition circuit 98 of FIG. 15 can play the role of the two addition circuits 80 and 86 in FIG. 14.

Next, by referring to FIGS. 16 through 21, an explanation will be given about another modification to the circuit shown in FIG. 14.

Figure 16:
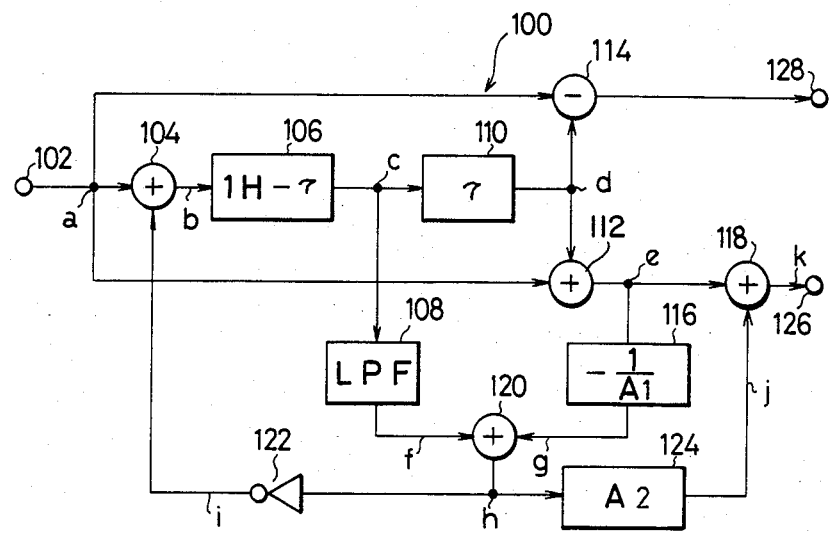
FIG. 16 is a circuit diagram showing another modification to the circuit given in FIG. 14.

Referring to FIG. 16, a modification to the vertical contour correction device as shown in FIG. 14 will be described with reference numeral 100. The correction device 100 has a signal input terminal 102 for supplying the video signal, the input terminal 102 is connected to one of the input terminals of a signal combining means, for example, an addition circuit 104, and the output terminal of the addition circuit 104 is connected to the input terminal of a delay line 106 with a delay time (1H−$\tau$). The output terminal of the delay line 106 is connected to the input terminal of a low-pass filter 108 and to the input terminal of a delay element 110. The delay time $\tau$ of the delay element 110 is chosen to have the same delay time as exists in the signal produced by the low-pass filter 108. That is, the delay time of the low-pass filter 108 is $\tau$ also. Further, the cut-off frequency of the low-pass filter 108 is chosen at about 2 MHz.

The output terminal of the delay element 110 is connected to one of the input terminals of an additive mixing means, for example, an addition circuit 112, and to one of the input terminals of a subtractive mixing means, for example, a subtraction circuit 114. The other input terminals of the addition circuit 112 and the subtraction circuit 114 are each connected to the signal input terminal 102. The output terminal of the addition circuit 112 is connected to an inverting amplifier 116 and to one of the input terminals of a signal combining means, for example, an addition circuit 118. The output of the inverting amplifier 116 and the output terminal of the low-pass filter 108 are connected to the each input terminal of signal sunthesizing means, for example, an addition circuit 120. The output terminal of the addition circuit 120 is connected via an inverter 122 to the other input terminal of the addition circuit 104, and to the other input terminal of the addition circuit 118 via an amplifier 124. The output terminal of the addition circuit 118 is connected to the output terminal 126 of the luminance signal, while the output terminal of the subtraction circuit 114 is connected to the output terminal 128 of the chrominance signal.

Moreover, in this example, the amplifier 116 has an amplification degree ($-1/A_1$) while the amplifier 124 has an amplification degree ($A_2$).

Next, the operation of the circuit in FIG. 16 will be described by referring to FIGS. 17 through 19. The signal supplied to the signal input terminal 102 is delayed by (1H−$\tau$) by the delay line 106, and is further delayed by $\tau$ by the delay element 110, so that there is obtained at the output terminal of the delay element 110 a signal which is delayed by precisely 1H relative to the input signal at the input terminal 102. Accordingly, at the addition circuit 112 and the subtraction circuit 114, additive mixing and subtractive mixing, respectively, are carried out between the signal applied at the input terminal 102 and the signals delayed by 1H. The luminance signal is obtained at the output terminal of the addition circuit 112, and the chrominance signal is obtained at the output terminal 128 of the subtraction circuit 114.

Figure 17A:
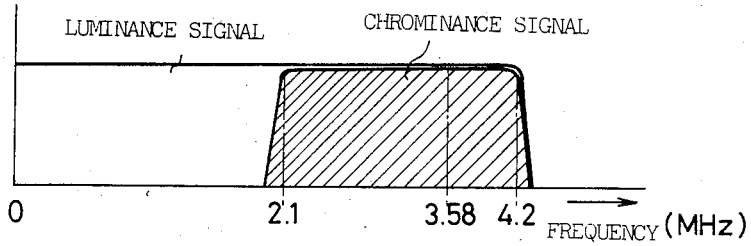
FIGS. 17a and 17b are diagrams illustrating the frequency spectrum of the compound video signals in the NTSC system and the characteristics of the low-pass filter utilized in the present invention.
Figure 17B:
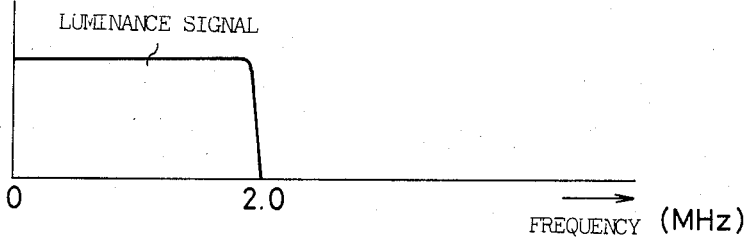

In addition, in the NTSC system, the chrominance components are transmitted by modulating the chrominance subcarrier (3 MHz) by the chrominance components and superposing, as shown by the spectrum in FIG. 17a, over the range between 1 MHz and 4.2 MHz within the 4.2 MHz band. In other words, the chrominance signal can exist only within the range of 4.2 MHz above and 2.1 MHz below the center of 3.58 MHz. On the other hand, at the output terminal of the low-pass filter 108 there is taken out the luminance signal component, as shown in FIG. 17b, since the cut-off frequency of the low-pass filter in FIG. 16 has been chosen at about 2 MHz. Therefore, the circuit of FIG. 16 becomes equivalent to the circuit in FIG. 13 for signals above 2 MHz, accomplishing the separation of the chrominance signal and the luminance signal by the so-called comb line filter function.

Next, correction to the vertical contour will be described by referring to FIGS. 18a through $18j_2$. In this connection it should be mentioned that the signals in FIGS. 18 and 19 with designations (a) to (k) indicate that they represent the signals at the corresponding portions (a) to (k) of FIG. 16. In FIG. 18a, the signal (a) represents the video signal supplied to the signal input terminal 102. For convenience, however, the same signal as shown in FIG. 6a is given here by deleting the portions corresponding to the synchronizing signals, and the duration for one horizontal scan is designated by 1H. The input signal (a) is delayed by $(1H-\tau)$ by being supplied to the delay line 106 via the addition circuit 104 to produce the waveform as shown in FIG. $18c_1$. It is further delayed by $\tau$ by the delay element 110 to become eventually a signal which is delayed by 1H relative to the input signal (a), as shown in FIG. $18d_1$. The signal $(d_1)$ and the input signal (a) are summed by the addition circuit 112, and at the output terminal of the addition circuit 112 there is obtained a signal as shown by FIG. $18e_1$.

Further, the output signal $(c_1)$ of the delay line 106 is delayed by the time $\tau$ due to going through the low-pass filter 108, delayed by 1H, similar to the signal $(d_1)$, relative to the input signal (a), and shows the waveform $(f_1)$(shown by the same waveform as for $d_1$). In addition, the output signal $(e_1)$ of the addition circuit 112 is multiplied by $-1/A_1$ ($-\frac{1}{2}$, for example) to produce a waveform as shown by FIG. $18g_1$. The signal $(g_1)$ and the signal $(f_1)$ are summed by the addition circuit 120 and produces a signal as shown by FIG. $18h_1$ at the output terminal of the addition circuit.

The signal $(h_1)$ is inverted by the inverter 122 to become a signal as shown by FIG. $18i$ and is fed back to the addition circuit 104. Therefore, at the output terminal of the addition circuit 104 there is obtained the sum of the signals (a) and (i) as shown by FIG. $19b_1$. This signal is delayed further by the delay line 106 and the delay element 110 to produce a signal delayed by 1H as shown by FIG. $18d_2$. The signal $(d_2)$ and the input signal (a) are summed by the addition circuit 112 to give a waveform as shown by $(e_2)$, and the output of the low-pass filter 108 has a waveform $(f_2)$ same as the signal $(d_2)$. Further, the signal $(e_2)$ is multiplied by $-\frac{1}{2}$ by the inverting amplifier 116 to produce the signal $(g_2)$, and the signal $(f_2)$ and the signal $(g_2)$ are summed by the addition circuit 120 to give the signal $(h_2)$. The signal $(h_2)$ is inverted by the inverter 122 to produce $(i_2)$, and the signal $(h_2)$ is multiplied by $A_2$ (3, for example) by the amplifier 124 to give a waveform as shown by FIG. $18j_2$.

The signal $(i_2)$ is fed back again to the addition circuit 104. As a result of repetition of such operations, at the output terminal of the addition circuit 112 there is obtained a signal with waveform as shown by FIG. 19d, at the output terminal of the addition circuit 120 there is obtained a signal as shown by FIG. 19h, and, further, at the output terminal of the amplifier 124 there is obtained a signal as shown by FIG. 19j.

The signals (e) and (j) of FIG. 19 are summed by the addition circuit 118, and as a result, at the output terminal 126 there is obtained a signal with vertical contour correction furnished simultaneously with preshoots and overshoots as shown by FIG. 19k.

It should be mentioned that the ratio of the amplitude of the signal for contour correction (FIG. 19j) to the amplitude of the original signal can be designed arbitrarily by appropriately choosing the amplification degrees and others for the inverting amplifier 116 and the amplifier 124.

In this manner, it is possible to furnish both of the preshoots and overshoots by the use of the circuit shown in FIG. 16 which involves just one delay line 106.

Next, a modifications to the foregoing embodiment according to the present invention will be described by referring to FIGS. 20 and 21. In these figures, the identical parts to the parts in FIG. 16 are designated by the identical symbols.

Figure 20:
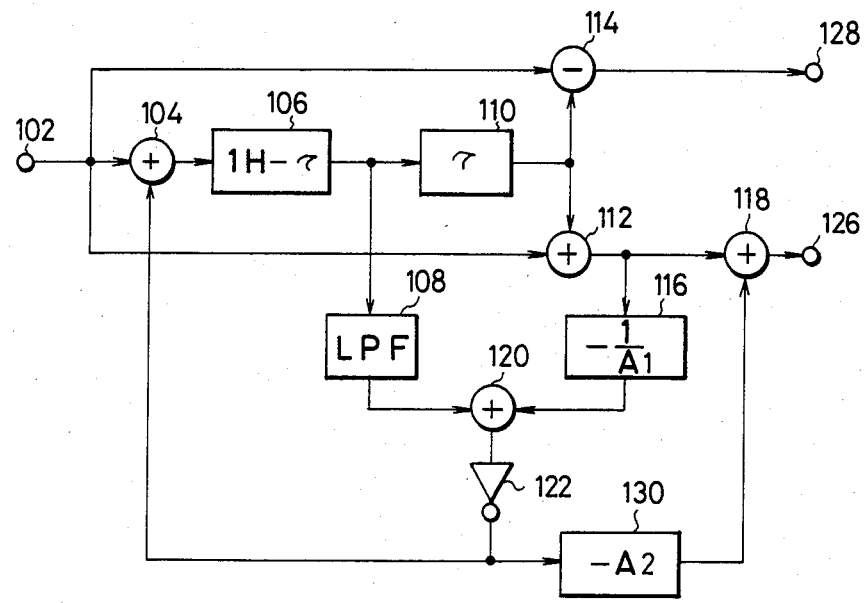
FIGS. 20 and 21 are circuit diagrams illustrating modifications to the circuit given in FIG. 16.

In the circuit shown in FIG. 20, at the output terminal of an addition circuit 120 there is arranged an inverter 122, and the output of the inverter 122 is branched out into two where one is fed back to the other input terminal of an addition circuit 104, while the other is supplied to the other input terminal of the addition circuit 118. In this modification, the amplification factor of an inverting amplifier 130 is chosen to be $(-A_2)$.

Figure 21:
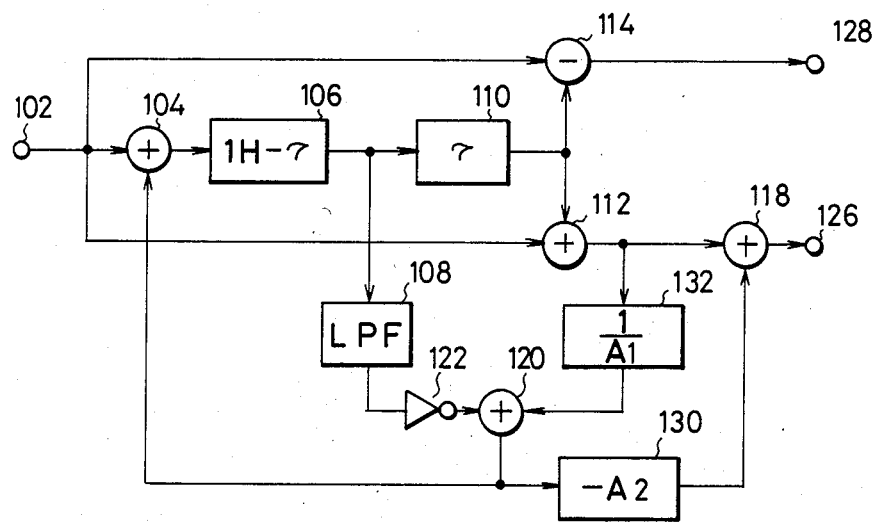

In the circuit shown in FIG. 21, an inverter 122 is inserted between a low-pass filter 108 and one of the input terminals of an addition circuit 120, and further an amplifier 132 is inserted between the output terminal of an addition circuit 112 and the other input terminal of the addition circuit 120. The output of the addition circuit 120 is fed back as is to the addition circuit 104 on the one hand, and is supplied to the other input terminal of the addition circuit 118 via an inverting amplifier 130 on the other. In this modification, the amplification factor of the amplified 132 is $(1/A)$ and the amplification factor of the inverting amplifier 130 is $(-A_2)$. In FIG. 21, the output of the inverter 122 corresponds to the signal obtained by inverting $(f_2)$ of FIG. 18, the output of the amplifier 132 corresponds to the inversion of $(g_2)$ in FIG. 18, and the output of the addition circuit 120 correspond to the signal $(i_2)$ in FIG. 18. Therefore, the output of the inverting amplifier 130 corresponds to $(j_2)$ in FIG. 19.

In this way, the circuits in accordance with the present invention possess the characteristics of a comb line filter, and makes it possible not only to separate the luminance signal and the chrominance signal but also to correct the vertical contour equipped with preshoots and overshoots. Moreover, the use of only one 1H delay line (actually a delay line with delay time of $1H-\tau$) suffices so that the circuit scale can be maintained small. Furthermore, the delay element 110 may be constructed by the use of ordinary delay element parts of small size rather than a large scale circuit such as CCD, keeping the required burden to a reasonable level.

In summary, according to the present invention it is possible to furnish the preshoots and the overshoots in a well-balanced manner to the vertical contour by the use of only one 1H delay line, instead of two 1H delay lines required in the prior art device, reducing the circuit scale markedly.

Moreover, it is possible to acomplish the separation between the luminance signal and the chrominance signal without spoiling the prior art effect of the comb line filter, and also to correct for the vertical contour.

Various modifications will become possible for those skilled in the art after receiving the teachings of the present disclosure without departing from the scope thereof.

What is claimed is:

1. A vertical contour correction device for imparting preshoot and overshoot to video signals from a video source and for correcting the vertical contour of the video signal in the vertical direction, which comprises:
   a first delay means for receiving said video signal and for providing a delayed video signal;
   first combining means for receiving said delayed video signal and a feedback signal and for producing a combined third signal;
   second delay means for receiving said combined third signal and for delaying same by (1H−τ) to produce a further delayed signal where H is a horizontal scan time and τ is a delay factor;
   subtraction means for receiving both the further delayed signal from said second delay means and said video siganl and for producing a chrominance signal as the difference between the said further delayed and video signals;
   second combining means for combining said video signal and the further delayed signal from the second delay means and for producing a fourth signal therefrom;
   a third delay means for receiving the fourth signal from the second combining means and for producing a fifth delay signal;
   feedback loop means connected between the output of said subtraction means and an input of said first combining means for applying the feedback signal to the first combining means;
   third combining means for receiving the fifth delay signal from said third delay means and the chrominance signal from said subtraction means; and
   first amplifier means for amplifying the chrominance signal from said subtraction means and for applying it to said third combining means, so as to produce a luminance signal.

2. A vertical contour correction device for imparting preshoot and overshoot to video signals from a video source and for correcting the vertical contour of the video signal in the vertical direction, which comprises:
   a first delay means for receiving said video signal and for providing a delayed video signal;
   first combining means for receiving said dealyed video signal and a feedback signal and for producing a third signal;
   second delay means for receiving said third signal and for delaying same by (1H−τ) to produce a further delayed signal where H is a horizontal scan time and τ is a delay factor;
   subtraction means for receiving both the delayed signal from said second dealy means and said video signal and for producing a chrominance signal as a difference between the further delayed and video signals;
   a third delay means for receiving the further delayed signal from the second delay means and for producing a fourth delayed signal;
   feedback loop means connected between the output of said subtraction means and an input of said first combining means for applying the feedback signal to the first combining means;
   second combining means for receiving the fourth delayed signal from said third delay means and the delayed video signal; and
   first amplifier means for amplifying the chrominance signal from said subtraction means and for applying it to said second combining means, for producing a luminance signal.

3. The vertical contour correction device as claimed in claim 2, wherein said feedback loop means comprises a second amplifier means and a low pass filter.

4. A vertical contour correction device for imparting preshoot and overshoot to video signals from a video source and for correcting the vertical contour of the video signal in the vertical direction, which comprises:
   first signal combining means for combining each of first signals, being input video signals with a second signal applied thereto and for producing a third signal corresponding to the combination of said first and second signals;
   dealy means for receiving said third signal and for delaying same by a 1H delay time where H is a horizontal scan time;
   subtraction means for receiving both the first signal and the third signal from said delay means and for producing a difference signal therebetween;
   feedback loop means connected between said subtraction means and said first combining means for feeding-back the difference signal as said second signal from said subtraction means to said first combining means; and
   second combining means for receiving both the third signal and the output signal from said subtraction means and for producing a vertical contour correction signal by combining said third signal and said subtraction means output signal.

5. The vertical contour correction device as claimed in claim 4, wherein said feedback loop means comprises a first amplifier means and inverter means.

6. The vertical contour correction device as claimed in claim 4, wherein said feedback loop means comprises a first amplifier means.

7. The vertical contour correction device as claimed in claim 6, wherein an inverter means is connected between the output of said subtraction means and said second combining means through said first amplifier means.

8. The vertical contour correction device as claimed in claim 6, wherein a second amplifier means is oonnected between the output of said subtraction means and an input of said second combining means.

9. The vertical contour correction device as claimed in claim 8, wherein the amplitication factors of the first and second amplifier means are the same and of opposite polarities with respect to each other.

10. A vertical contour correction device for imparting preshoot and overshoot to video signals from a video source and for correcting the vertical contour of the video signal in the vertical direction, which comprises:
   first combining means for combining said video signal from the video source with a feedback signal and for producing a third combined signal;
   first delay means for receiving the third combined signal and for delaying it by (1H−τ) delay time for producing a delayed signal, where H is a horizontal scan time and τ is a delay factor;
   filter means for receiving the delayed signal from the first delay means and for passing only a low frequency component thereof to provide a low frequency signal;

a second dealy means for receiving delayed signal from the first dealy means and for delaying it by delay time to produce a second delayed signal;

subtraction means for receiving both the input video signal and the second delayed signal and for producing a luminance signal;

second combining means for receiving both the input video signal and the second delayed signal from the second delay means and for producing a second combined signal;

third combining means for receiving both the low frequency signal from the filter means and an amplified signal of the second combined signal through a first amplifier means, so as to produce a third combined signal;

a second amplifier means for amplifying the third combined signal to produce a fifth signal; and fourth combining means for receiving both the second combined signal and the fifth signal for producing a chrominance signal; and feedback loop means connected between an output of the third combining means and an input of the first combining means for applying the feedback signal to the first combining means.

11. The vertical contour correction device as claimed in claim 10, wherein an inverter means is included in said feedback loop means so as to feedback an inverted feedback signal to the first combining means.

12. The vertical contour correction device as claimed in claim 10, wherein the amplification factor of the first amplifier means is 1/A1 and its polarity is negative while the amplification factor of the second amplifier means is A2 and its polarity is positive.

13. The vertical contour correction device as claimed in claim 10, wherein an inverter means is connected between an output of the third combining means and an input of said second amplifier means.

14. The vertical contour correction device as claimed in claim 13, wherein the polarity of the amplification factor of the first amplifier means is negative and that of the second amplifier means is also negative.

15. The vertical contour correction device as claimed in claim 10, wherein an inverter means is connected between an output of the filter means and an output of the third combining means.

16. The vertical contour correction device as claimed in claim 15, wherein the polarity of the amplification factor of the first amplifier means is positive and that of the second amplifier means is negative.

* * * * *